US012535467B2

(12) United States Patent
Brisbin (10) Patent No.: US 12,535,467 B2
(45) Date of Patent: Jan. 27, 2026

(54) LINEAR ACTUATOR FOR CHROMATOGRAPHY

(71) Applicant: Valco Instruments Company, Inc., Houston, TX (US)

(72) Inventor: Martin P. Brisbin, Houston, TX (US)

(73) Assignee: Valco Instruments Company, Inc., Houston, TX (US)

( * ) Notice: Subject to any disclaimer, the term of this patent is extended or adjusted under 35 U.S.C. 154(b) by 757 days.

(21) Appl. No.: 17/961,123

(22) Filed: Oct. 6, 2022

(65) Prior Publication Data

US 2024/0036014 A1 Feb. 1, 2024

Related U.S. Application Data

(60) Provisional application No. 63/393,351, filed on Jul. 29, 2022.

(51) Int. Cl.
*G01N 30/60* (2006.01)
*F16H 25/20* (2006.01)
*G01N 30/02* (2006.01)

(52) U.S. Cl.
CPC ......... *G01N 30/6047* (2013.01); *F16H 25/20* (2013.01); *F16H 2025/204* (2013.01); *G01N 2030/027* (2013.01)

(58) Field of Classification Search
CPC ......... G01N 30/6047; G01N 2030/027; G01N 2030/326; F16H 2025/204; F16H 2025/2078; F16H 25/20
See application file for complete search history.

(56) References Cited

U.S. PATENT DOCUMENTS

| | | | |
|---|---|---|---|
| 4,500,805 A | 2/1985 | Swanson |
| 4,553,056 A | 11/1985 | Pfister |
| 5,053,660 A | 10/1991 | Sneedon |
| 5,217,590 A | 6/1993 | Lauer et al. |
| 5,253,981 A | 10/1993 | Yang et al. |
| 5,398,780 A | 3/1995 | Althof et al. |
| 5,974,948 A | 11/1999 | Thompson et al. |
| 6,092,995 A | 7/2000 | Morikawa |
| 6,101,889 A | 8/2000 | Laskey |

(Continued)

FOREIGN PATENT DOCUMENTS

| | | | |
|---|---|---|---|
| CN | 209878689 U | 12/2019 |
| EP | 0911542 B1 | 9/2002 |

(Continued)

OTHER PUBLICATIONS

Kari Rodriquez, Invitation to Pay Additional Fees and Where Applicable Protest Fee for PCT Application Serial No. PCT/US2023/070490, USPTO as the International Searching Authority, Oct. 19, 2023, 4 pages, Alexandria, VA.

(Continued)

*Primary Examiner* — Pranav N Patel
(74) *Attorney, Agent, or Firm* — James E. Hudson, III; Crain Caton & James, P.C.

(57) ABSTRACT

A rod-style linear actuator for use with a housing associated with an axially-rotatable hollow internally-threaded shaft and a piston-driven device is provided where small, precise movement is necessary. The actuator includes a body, a lead screw engaging the axially-rotatable hollow internally-threaded shaft and terminating in a piston, and an anti-rotation device extending from to the lead screw and engaging one of the body or an opposing second body.

13 Claims, 3 Drawing Sheets

(56) References Cited

U.S. PATENT DOCUMENTS

| | | |
|---|---|---|
| 6,603,229 B1 | 8/2003 | Toye |
| 6,791,220 B1 | 9/2004 | Suzuki et al. |
| 6,806,597 B2 | 10/2004 | Kondo |
| 6,857,332 B2 | 2/2005 | Pfister |
| 6,882,073 B2 | 4/2005 | Suzuki et al. |
| 6,931,982 B1 | 8/2005 | Zajac et al. |
| 7,337,882 B2 | 3/2008 | Geyer |
| 7,337,883 B2 | 3/2008 | Geyer |
| 7,939,979 B2 | 5/2011 | Hochhalter et al. |
| 8,314,519 B2 | 11/2012 | Eckstein et al. |
| 8,823,229 B2 | 9/2014 | Brieschke |
| 9,252,649 B2 | 2/2016 | Kakiuchi et al. |
| 9,479,026 B2 | 10/2016 | Rapp et al. |
| 9,863,513 B2 | 1/2018 | Rousseau et al. |
| 10,090,730 B2 | 10/2018 | Rudy |
| 10,502,294 B2 | 12/2019 | Piermarini et al. |
| 2015/0285348 A1 | 10/2015 | Ikeda et al. |
| 2021/0190053 A1 | 6/2021 | Wagner et al. |

FOREIGN PATENT DOCUMENTS

| | | |
|---|---|---|
| EP | 2199624 B1 | 6/2012 |
| EP | 3023638 A1 | 5/2016 |

OTHER PUBLICATIONS

Julian Anton, Implementing Anti-Rotational Guidance for Stepper Motor Linear Actuators, techbriefs.com, Feb. 1, 2019, 8 pages, Thomson Industries, Wood Dale, Illinois, retrieved Jul. 2, 2022 from https://www.techbriefs.com/component/content/article/tb/supplements/md/features/articles/33715.

Actuator range catalog, Oct. 2021, 312 pages, Electro-Matic, Farmington Hills, Michigan, retrieved Jul. 2, 2022 from https://products.electro-matic.com/wp-content/uploads/2021/11/Electro-Matic_Actuator_range.pdf.

Leyg, Electric Actuator, Guide Rod Type, AC Servo Motor (100/200W), 2011, 3 pages, SMC Corporation of America, retrieved Jul. 2, 2022 from https://www.smcusa.com/products/leyg-electric-actuator-guide-rod-type-ac-servo-motor-100-200w~125741.

ERC2-RGD6C / RGD7C Rod Type Double Guide Electric Actuator, 2022, 9 pages, IAI America, Inc., retrieved Jul. 2, 2022 from https://www.intelligentactuator.com/erc2-rgd6c-rgd7c-rod-type-double-guide-electric-actuator/.

Karl Rodriguez; International Search Report and Written Opinion for PCT/US23/70490; Mar. 12, 2024; 17 pages; United States Patent and Trademark Office as the International Search Authority; Alexandria, VA.

Fiona Doherty; International Preliminary Report on Patentability for PCT App. Serial No. PCT/US2023/070490; Feb. 4, 2025; 12 pages; United States Patent and Trademark Office as the Preliminary Examining Authority.

LINEAR ACTUATOR FOR CHROMATOGRAPHY

CROSS-REFERENCE TO RELATED APPLICATIONS

This application claims the benefit of U.S. Provisional Application No. 63/393,351, filed Jul. 29, 2022.

STATEMENT REGARDING FEDERALLY SPONSORED RESEARCH OR DEVELOPMENT

Not Applicable.

BACKGROUND

1. Field

The present disclosure pertains to rod-style linear actuators used with a housing and a piston-driven device, for use where small, precise movement is necessary. More particularly, the present discloses pertains to a rod-style linear actuator used with a motor driving a hollow threaded shaft and with a piston-driven device where repeated, equal, and precise displacement is required.

2. Description of the Related Art

High performance liquid chromatography is generally performed using pumps, injection valves, columns, and detectors scaled to deliver samples and fluids, often of particularly small volumes, under pressure. The volumes pumped may quite small, requiring precise pump control and output. These pumps may be piston driven, necessitating that the piston smoothly reciprocates through a highly-controlled displacement at a controlled rate of advancement or retreat. It is known to couple such pistons to a linear actuator to effect this motion. Linear actuators used for this purpose often include a rotating element, such as a lead screw, and a corresponding nut or an anti-rotation device. When a nut is used, the lead screw is fixed in position relative to a motor and therefore causes a nut, prevented from rotating, to move along the threads of the lead screw to advance or retreat. When an anti-rotation device is used the system functions somewhat differently, where the lead screw engages an axially-rotatable hollow internally-threaded shaft and the anti-rotation device, wherein the anti-rotation device is prevented from rotating with the lead screw and, by fixed relative to the lead screw, causes the lead screw to advance or retreat relative to the internally-threaded shaft.

Problematically, when the anti-rotation device engages the lead screw adjacent the housing rather than near the piston, the lead screw can oscillate or otherwise vary in position at its distant end, where the piston-driven pump is located, causing friction, wear, and loss of precision in piston movement as the piston must overcome the associated intermittent binding.

It would therefore be desirable to provide a rod-style linear actuator for use with a housing associated with an axially-rotatable hollow internally-threaded shaft and a piston-driven device which includes a body, a lead screw engaging the axially-rotatable hollow internally-threaded shaft and terminating at a piston, and an anti-rotation device extending from the lead screw and engaging one of the body or an opposing second body which would reduce the potential for variations in position of the piston and deviations in speed and position of the piston.

SUMMARY

The present disclosure therefore meets the above needs and overcomes one or more deficiencies in the prior art.

A rod-style actuator is thus provided which provides a displacement and is used in conjunction with a housing, containing a motor which drives an axially-rotatable hollow internally-threaded shaft positioned within the housing, and in conjunction with a piston-driven device which includes a body, a lead screw, an anti-rotation device, and a piston. The body has a body rear face and an oppositely-positioned body external front face, is adapted to couple to the housing at the body rear face and to couple to the piston-driven device at the body external front face, has a first passageway from the body rear face toward the body external front face about a body central axis and terminating at a body internal face which has a first passageway cross-sectional profile and a first passageway length not less than the sum of the displacement and an anti-rotation device length, has a second passageway from the body external front face to the body internal face along the body central axis which has a second passageway length less than the displacement and a second passageway cross-sectional profile narrower than the first passageway cross-sectional profile, and has a guide pin attached to the body at the body internal face which extends a guide pin length parallel to the body central axis where the guide pin length at least equal to the sum of the displacement and the anti-rotation device length and is not greater than the first passageway length. The lead screw has a lead screw threaded section which terminates at a lead screw rear end and a lead screw main body which terminates at a lead screw first end opposite the lead screw rear end is adapted to engage the axially-rotatable hollow internally-threaded shaft and wherein the lead screw threaded section has a lead screw threaded length greater than the displacement. The anti-rotation device extends from the lead screw at the lead screw main body, where the anti-rotation device length extends from an anti-rotation device front to an anti-rotation device rear, and has a guide pin passage therethrough aligned with the guide pin, and where the guide pin is sized to pass through the guide pin passage to permit the anti-rotation device to slideably move along the guide pin, and where the anti-rotation device is sized to move within the first passageway. The piston extends from the lead screw at the lead screw first end and is sized to slidably reciprocate through the second passageway and is configured for attachment to the piston-driven device, has a piston length greater than the displacement and is sized to reciprocate within the second passageway.

A rod-style actuator is further provided which has a displacement and is for use with a housing containing a motor, which drives an axially-rotatable hollow internally-threaded shaft, the axially-rotatable hollow internally-threaded shaft positioned within the housing, and for use with a piston-driven device, which includes a body, a second body, a lead screw, an anti-rotation device, and a piston. The body has a body rear face and an oppositely positioned body external front face, where the body is adapted to couple to the housing at the body rear face and to couple to the piston-driven device at the body external front face, has a first passageway from the body rear face toward the body external front face about a body central axis and terminating at a body internal face, where the first passageway has a first passageway cross-sectional profile and has a first passageway length not less than the sum of the displacement and an anti-rotation device length, has a second passageway from the body external front face to the body internal face along the body central axis, where the second passageway has a second passageway length less than the displacement and has a second passageway cross-sectional profile narrower than the first passageway cross-sectional profile, where the second body 248 sized to fixedly engage one of the body and the housing and has a guide pin attached to the second body at a second body internal face, where the guide pin is parallel to the body central axis and has a guide pin cross-sectional profile, and where the guide pin extends a guide pin length toward the body internal face, where the guide pin length at least equal to the sum of the displacement and the anti-rotation device length. The lead screw has a lead screw threaded section terminating at a lead screw rear end and a lead screw main body terminating at a lead screw first end opposite the lead screw rear end, where the lead screw is adapted to engage the axially-rotatable hollow internally-threaded shaft, and has a lead screw threaded length greater than the displacement. The anti-rotation device extends from the lead screw at the lead screw main body away from the body central axis, has an anti-rotation device length from an anti-rotation device front to an anti-rotation device rear, has a guide pin passage therethrough, where in the guide pin passage is aligned with the guide pin, and where the guide pin passage is sized to a guide pin passage cross-sectional profile to permit the anti-rotation device to slideably move along the guide pin, and where the anti-rotation device has an anti-rotation device cross-sectional profile and is sized to fit within the first passageway, such that the guide pin passage cross-sectional profile is larger than the guide pin cross-sectional profile. The piston extends from the lead screw along the body central axis at the lead screw first end and sized to slidably reciprocate through the second passageway and is configured for attachment to the piston-driven device, wherein the piston has a piston length and a piston cross-sectional profile, where the piston is sized to fit within than the second passageway without interference.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DESCRIPTION

Figure 1:
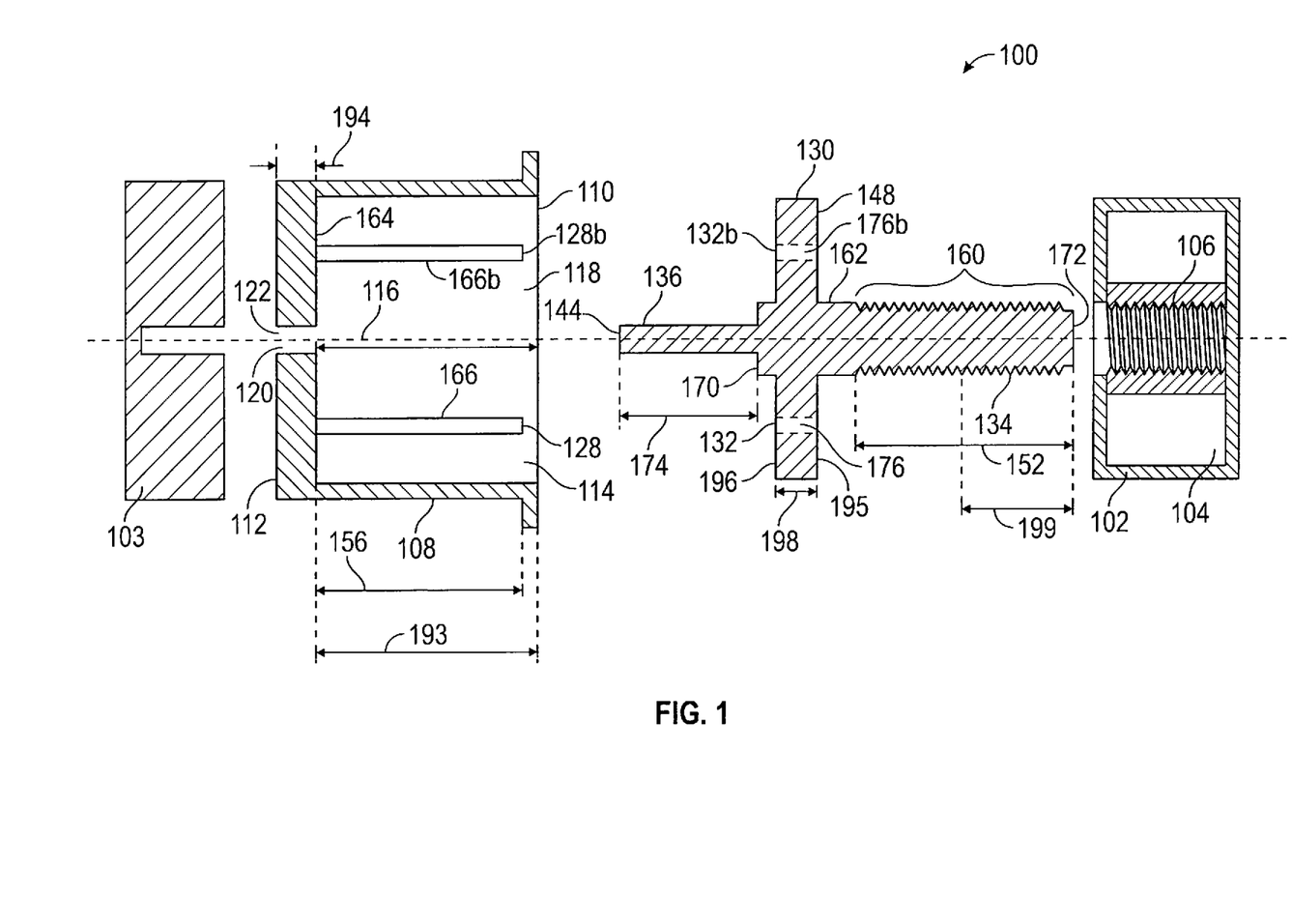
FIG. 1 is an illustration of a rod-style linear actuator where an anti-rotation device engages a fixed guide pin extending from a body.

Referring to FIG. 1, an illustration of a rod-style linear actuator, having a displacement 199 where an anti-rotation device engages a fixed guide pin extending from a body is provided. The rod-style actuator 100 is intended for use with a housing 102 and a piston-driven device 103. The housing 102 contains a motor 104 which drives an axially-rotatable hollow internally-threaded shaft 106, the axially-rotatable hollow internally-threaded shaft 106 positioned within the housing 102. The axially-rotatable hollow internally-threaded shaft 106 may be provided within the motor 104, or may be provided at the end of a solid motor shaft 302 associated with the motor 104, or may be provided at the end 404 of a gear body 402 connected to the motor 104. An illustration of the axially-rotatable hollow internally-threaded shaft 106 provided at the end of a solid motor shaft 302 associated with the motor 104 is provided in FIG. 3. An illustration of the axially-rotatable hollow internally-threaded shaft 106 provided at the end 404 of a gear body 402 connected to the motor 104 is provided in FIG. 4. The motor 104 may be a stepper motor or other motor which can be precisely controlled, such as by an associated processor or control system, which may be a computer. The piston-drive device may be a pump or other device which couples to the piston 136, and which may be sealed against the body 108, such that the precise movement of the piston 136 provides a high degree of control and precision in operation. The rod-style actuator 100 includes a body 108, a lead screw 134, an anti-rotation device 130, and a piston 136.

The body 108 is positioned intermediate the housing 102 and the piston-driven device 103. The body 108 has a body rear face 110 and a body external front face 112, where the body rear face 110 is located opposite the body external front face 112. To maintain position, the body 108 may be adapted to couple to the housing 102 at the body rear face 110 and may be adapted to couple to the piston-driven device 103 at the body external front face 112.

The body 108 provides the internal void through which the lead screw 134, anti-rotation device 130, and piston 136 transit dining operation. The body 108 has a first passageway 114 from the body rear face 110 toward the body external front face 112 about a body central axis 116 which terminates at a body internal face 164. The first passageway 114 may have a first passageway cross-sectional profile 118, which may be a cylindrical profile and or may be another first passageway cross-sectional profile, such as defining a rectangular prism. The body 108 further has a second passageway 120 from the body external front face 112 to the body internal face 164 along the body central axis 116 with a second passageway length 194 less than the displacement 199. The second passageway 120 has a second passageway cross-sectional profile 122. The first passageway cross-sectional profile 118 may be complementary to the second passageway cross-sectional profile 122, such as both being cylindrical. Because the second passageway 120 provides the passage for the piston 136, the second passageway 120 is narrower than the first passageway 114. When both the first passageway 114 and the second passageway 120 are cylindrical, the second passageway cross-sectional profile 122 has a diameter less than the diameter of the first passageway cross-sectional profile 118. The first passageway 114 has a first passageway length 193 which is not less than the sum of the displacement 199 and an anti-rotation device length 198.

The body 108 may provide the structure to prevent the anti-rotation device 130 from rotating and the structure and space to advance and retreat with the lead screw 134 and the piston 136. The body 108 may be provided with a guide pin 128, which is attached to the body 108 at the body internal face 164, and positioned parallel to the body central axis 116. Beneficially, the guide pin 128 provides minimal surface area and therefore minimal friction while ensuring a close fit between the guide pin 128 and any mating component.

Referring again to FIG. 1, when the anti-rotation device 130, the lead screw 134, and the piston 136 advance and retreat within the first passageway 114, they do so along or parallel to the body central axis 116, preventing binding and any increased friction which might alter movement of the piston 136. The guide pin 128, which has a guide pin length 156, has a guide pin cross-sectional profile 166. The guide pin length 156 is at least equal to the sum of the displacement 199 and the anti-rotation device length 198 and not greater than the first passageway length 193 to ensure the anti-rotation device 130 can travel the displacement 199 along the guide pin 128.

Figure 3:
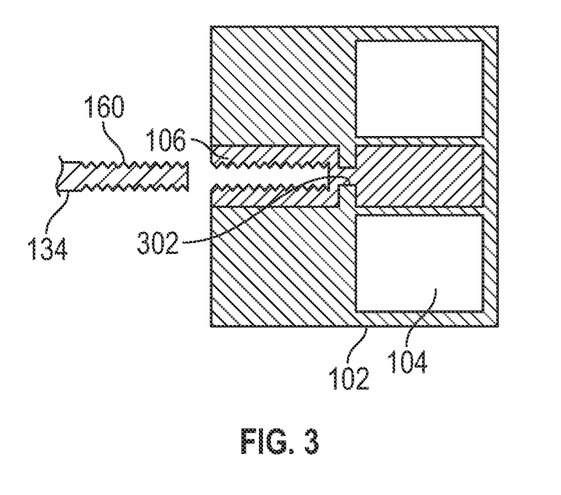
FIG. 3 is an illustration of the axially-rotatable hollow internally-threaded shaft provided at the end of a solid motor shaft.
Figure 4:
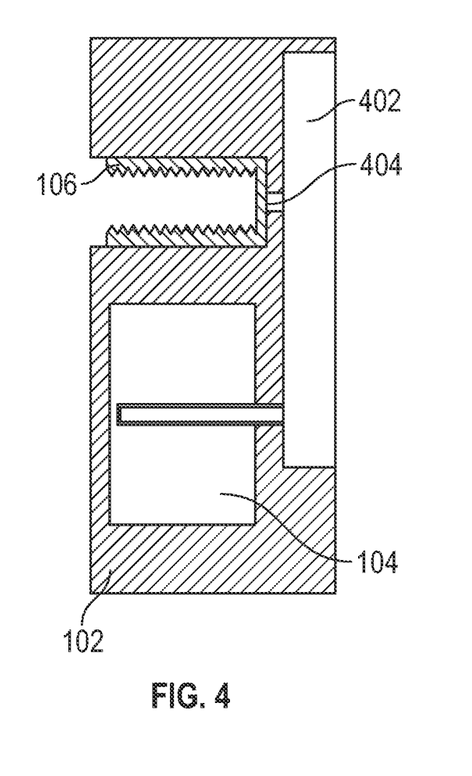
FIG. 4 is an illustration of the axially-rotatable hollow internally-threaded shaft connected to a gear body.

Movement of the piston 136 is effected by movement of the lead screw 134 as a result of the rotation of the axially-rotatable hollow internally-threaded shaft 106, whether provided within the motor 104, at the end of a solid motor shaft 302 associated with the motor 104, or at the end 404 of a gear body 402 connected to the motor 104. To provide for rotation, movement and the displacement of the piston 136, the lead screw 134 has a lead screw threaded section 160, having a lead screw threaded length 152 greater than the displacement 199 to ensure continued engagement between the lead screw 134 and the axially-rotatable hollow internally-threaded shaft 106 at maximum displacement, terminating at a lead screw rear end 172 and a lead screw main body 162 terminating at a lead screw first end 170, where the lead screw rear end 172 is opposite the lead screw first end 170. The lead screw 134 is adapted to engage the axially-rotatable hollow internally-threaded shaft 106 and, with the lead screw threaded length 152, to remain engaged with the axially-rotatable hollow internally threaded shaft 106 at each end of the displacement 199.

Linear displacement of the lead screw 134, and therefore the piston 136, is made possible by the anti-rotation device 130 which moves with the lead screw 134 and maintains the lead screw 134 along the body central axis 116. Referring to FIG. 1, the anti-rotation device 130 extends from the lead screw 134 at the lead screw main body 162 away from the body central axis 116, and has a guide pin passage 132 therethrough and has an anti-rotation device length 198 from an anti-rotation device front 196 to an anti-rotation device rear 195. The guide pin passage 132 has a profile consistent with the guide pin cross-sectional profile 166, which may both be cylindrical. The anti-rotation device 130 may be attached to the lead screw 134 or may be formed from it. The guide pin passage 132 provides the arresting of rotation of the anti-rotation device 130 during rotation of the axially-rotatable hollow internally-threaded shaft 106. The guide pin passage 132 is aligned with the guide pin 128, where the guide pin 128 is sized, by virtue of the guide pin cross sectional profile 166, to pass through a guide pin passage 132, by virtue of the guide pin passage cross-sectional profile 176, which may be cylindrical, to permit the anti-rotation device 130 to slideably move along the guide pin 128. The guide pin length 156 is at least equal to the sum of the displacement 199 and the anti-rotation device length 198 to ensure the anti-rotation device 130 can travel the displacement 199 along the guide pin 128. The guide pin passage cross-sectional profile 176 is complementary to and larger than the guide pin cross-sectional profile 166 to avoid interference, permitting the guide pin 128 and the guide pin passage 132 provide a movement guide without introducing unnecessary voids. Thus, the anti-rotation device 130 will ride up and down the guide pin 128 during advancement or retreat relative to the housing 102 with the lead screw 134 to provide stability. The anti-rotation device 130 may be provided with one of a low-friction surface, a coating, and bearings at the guide pin passage 132.

The anti-rotation device 130, which may be sized to slidably fit within the first passageway 114 to reduce vibration, reduces any potential deflection of the lead screw 134 from the body central axis 116 by its shape. The anti-rotation device 130 may be cylindrical. The anti-rotation device 130 has an anti-rotation device cross-sectional profile 148 which differs from the first passageway cross-sectional profile 118 such that the anti-rotation device 130 is sized to fit within the first passageway 114. The first passageway 114 has a first passageway cross-sectional profile 118 and the anti-rotation device 130 has the anti-rotation device cross-sectional profile 148, such that the first passageway cross-sectional profile 118 is complementary to and larger than the anti-rotation device cross-sectional profile 148. The anti-rotation device cross-sectional profile 148 is thus sufficiently less than the first passageway cross-sectional profile 118 to avoid interference, but sized to the first passageway 114 to ensure the anti-rotation device 130 advances and retreats in the first passageway 114 without introducing unnecessary voids and thus provides a movement guide.

Thus, the guide pin passage 132, by virtue of the guide pin passage cross-sectional profile 176, surrounds the guide pin 128 without interference while the anti-rotation device 130 moves within the first passageway 114 without interference.

When desired, a second guide pin 128*b*, preferably opposite the body central axis 116 from the guide pin 128, can be used to increase stability and reduce deflection or wobble. When used, the second guide pin 128*b* is attached to the second body 248 at the body internal face 164 parallel to the body central axis 116. The second guide pin 128*b* may have the guide pin cross-sectional profile 166 and extends the guide pin length 156. When a second guide pin 128*b* is used, the anti-rotation device 130 is provided with a second guide pin passage 132*b* therethrough, where the second guide pin passage 132*b* is aligned with the second guide pin. 128*b*. The second pin guide 128*b*, by virtue of the guide pin cross-sectional profile 166, is sized to pass through the second guide pin passage 132*b* and to permit the anti-rotation device 130 to slideably move along the second guide pin 128*b* without interference. The second guide pin 128*b* may have a second guide pin cross-sectional profile 166*b* where the second guide pin passage 132*b* has a second guide pin passage cross-sectional profile 176*b*, such that the second guide pin passage cross-sectional profile 176*b* is complementary to and larger than the second guide pin cross-sectional profile 166*b*.

With the lead screw 134 maintained along the body central axis 116, the piston 136 can thereby drive the piston-driven device 103 with minimal misalignment and therefore friction and deviations in the rate of advancement or retreat. The piston 136 extends from the lead screw 134 at the lead screw first end 170 along the body central axis 116 and is sized to slidably reciprocate through the second passageway 120 and is configured for attachment to the piston-driven device 103. The piston 136 may integrally formed from the lead screw 134 or may be attached to the lead screw 134. The piston 136 has a piston length 174, which is greater than the displacement 199 to ensure the piston 136 remains at least partially within the second passageway 120 at all times and thus ensures the piston 136 cannot be fully withdrawn from the second passageway 120. To ensure the piston 136 can advance and retreat the necessary displacement, the piston 136 has a piston cross-sectional profile 144 which differs from the second passageway cross-sectional profile 122 such that the piston 136 is sized to reciprocate within the second passageway 120 without interference, ensuring the piston 136 advances and retreats in the second passageway 120, without introducing unnecessary voids, and providing a movement guide. The second passageway 120 has a second passageway cross-sectional profile 122 and the piston 136 has a piston cross-sectional profile 144, such that the second passageway cross-sectional profile 122 may be complementary to and larger than the piston cross-sectional profile 144. As the piston cross-sectional profile 144 may be cylindrical and as the second passageway cross-sectional profile 122 may be cylindrical, the piston cross-sectional profile 144 has a diameter sufficiently less than the diameter of the second passageway 120 to avoid interference.

Figure 2:
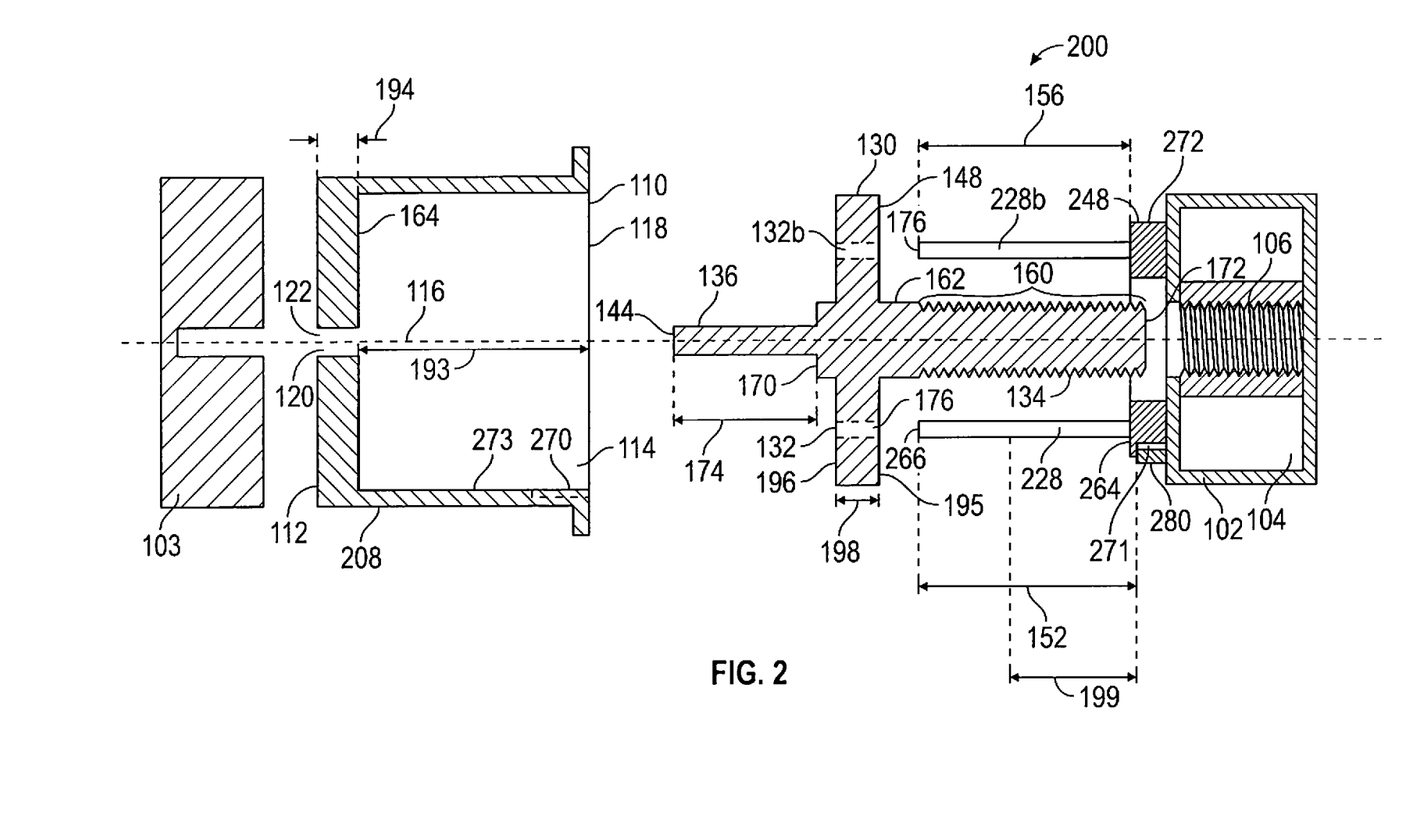
FIG. 2 is an illustration of a rod-style linear actuator where an anti-rotation device engages a fixed guide pin extending from an opposing second body.

Referring to FIG. 2, an illustration of a rod-style linear actuator 200 where an anti-rotation device 130 engages an opposing second body 248 is provided, Rather than a body 208 having one or more guide pins 128, one or more guide pins 228 may be provided on a second body 248.

The body 208 provides the connection between the housing 102 and the piston-driven device 103. The body 208 has the body rear face 110 and the body external front face 112, where the body rear face 110 is located opposite the body external front face 112. To maintain position, the body 108 is adapted to couple to the housing 102 at the body rear face 110 and is adapted to couple to the piston-driven device 103 at the body external front face 112. The body 208 provides the internal void through which the lead screw 134, anti-rotation device 130, and piston 136 transit during operation. The body 208 has the first passageway 114, having the first passageway cross-sectional profile 118, from the body rear face 110 toward the body external front face 112 about the body central axis 116 which terminates at a body internal face 164. The body 208 further has the second passageway 120, having a second passageway cross-sectional profile 122, from the body external front face 112 to the body internal face 164 along the body central axis 116 and the second passageway length 194 less than the displacement 199. Because the second passageway 120 provides the passage for the piston 136, second passageway cross-sectional profile 122 is narrower than the first passageway cross-sectional profile 118.

The second body 248 is sized to fixedly engage one, or both, of the body 208 and the housing 102. The second body 248 may be cylindrical and captured within the first passageway 114. The second body 248 may include a profile to mate to the body 208 and preclude rotation of the second body 248 relative to the body 208. The second body 248 may have a second body keyway 271 on a second body exterior face 272 adapted to receive to a key 280 where the body 208 may have a body keyway 270 on a first passageway interior face 273 adapted to receive the key 280, where the body 208 and second body 248 are maintained in relation to one another with the key 280.

The second body 248 has a guide pin 228, which is attached to the second body 248 at a second body internal face 264. The guide pin 228 is parallel to the body central axis 116 and has a guide pin cross-sectional profile 266. The guide pin 228 thus extends a guide pin length 156 toward the body internal face 164. The guide pin length 156 at least equal to the sum of the displacement 199 and an anti-rotation device length 198. The guide pin 228 has the guide pin cross-sectional profile 266 and extends the guide pin length 156. This is coupled with a modified anti-rotation device 130 which has a guide pin passage 132 therethrough. The guide pin passage 132 is aligned with the guide pin 228 and the second guide pin passage 132 is sized to the guide pin passage 132 by virtue of the guide pin cross-sectional profile 266 and the guide pin passage cross-sectional profile 176 to permit the anti-rotation device 130 to slideably move along the guide pin 228.

When desired, a second guide pin 228b, which may be opposite the body central axis 116 from the guide pin 228, can be used to increase stability and reduce any deflection or wobble. When desired, the second guide pin 228b is attached to the second body 248 at the second body internal face 264 parallel to the body central axis 116. The second guide pin 228b has the guide pin cross-sectional profile 266 and extends the guide pin length 156. This is coupled with a modified anti-rotation device 130 which has a second guide pin passage 132h therethrough. The second guide pin passage 132b is aligned with the second guide pin 228b and the second guide pin passage 132b is sized to the second guide pin passage 228b by virtue of the guide pin cross-sectional profile 266 and the guide pin passage cross-sectional profile 176 to permit the anti-rotation device 130 to slideably move along the second guide pin 228h.

Likewise, the variations provided where the body 108 has one or more guide pins 128 may be applied where the one or more guide pins 228 are provided on a second body 248, particularly wherein the axially-rotatable hollow internally-threaded shaft 106 is provided at one of within the motor 104, at the end of a solid motor shaft 302 associated with the motor 104, and at the end 404 of a gear body 402 connected to the motor 104, and wherein the anti-rotation device 130 is attached to the lead screw 134, wherein the anti-rotation device 130 is formed integral with the lead screw 134 and where the guide pin passage 132 is sized to fit around the guide pin 128 without interference, by virtue of the guide pin passage cross-sectional profile 176 and the guide pin cross sectional profile 166, while the anti-rotation device 130 sized to fit within the first passageway 114 without interference.

The body 108, 208 the lead screw 134, the anti-rotation device 130 and any second body 248 thus assure the piston 136 moves linearly along the body central axis 116 and avoids deviations which could affect the rate of advancement of the piston 136.

The terms and expressions which have been employed in the foregoing specification are used therein as terms of description and not of limitation, and there is no intention, in the use of such terms and expressions, of excluding equivalents of the features shown and described or portions thereof.

I claim:

1. A rod-style actuator having a displacement for use with a housing and a piston-driven device,
the housing containing a motor,
the motor driving an axially-rotatable hollow internally-threaded shaft, the axially-rotatable hollow internally-threaded shaft positioned within the housing, comprising,
a body,
the body having a body rear face and a body external front face,
 the body rear face opposite the body external front face,
the body adapted to couple to the housing at the body rear face,
the body adapted to couple to the piston-driven device at the body external front face,
the body having a first passageway from the body rear face toward the body external front face about a body central axis and terminating at a body internal face,
 the first passageway having a first passageway cross-sectional profile,
 the first passageway having a first passageway length not less than the sum of the displacement and an anti-rotation device length,
and
the body having a second passageway from the body external front face to the body internal face along the body central axis,
 the second passageway having a second passageway length less than the displacement,
 the second passageway having a second passageway cross-sectional profile,
 the second passageway cross-sectional profile narrower than the first passageway cross-sectional profile,
the body having a guide pin,
 the guide pin attached to the body at the body internal face,
 the guide pin parallel to the body central axis,
 the guide pin extending a guide pin length,
 the guide pin length at least equal to the sum of the displacement and the anti-rotation device length and not greater than the first passageway length;
a lead screw having a lead screw threaded section terminating at a lead screw rear end and a lead screw main body terminating at a lead screw first end,
the lead screw rear end opposite the lead screw first end,
the lead screw adapted to engage the axially-rotatable hollow internally-threaded shaft,
the lead screw threaded section having a lead screw threaded length greater than the displacement;
an anti-rotation device extending from the lead screw at the lead screw main body away from the body central axis,
the anti-rotation device length from an anti-rotation device front to an anti-rotation device rear,
the anti-rotation device having a guide pin passage therethrough,
 the guide pin passage aligned with the guide pin,
 the guide pin sized to pass through the guide pin passage to permit the anti-rotation device to slideably move along the guide pin,
the anti-rotation device sized to move within the first passageway; and
a piston,
the piston extending from the lead screw along the body central axis at the lead screw first end and configured for attachment to the piston-driven device,
the piston having a piston length greater than the displacement,
the piston sized to slidably reciprocate within the second passageway.

2. The rod-style actuator of claim 1, further comprising:
the body having a second guide pin,
 the second guide pin attached to the body at the body internal face,
 the second guide pin parallel to the body central axis,
 second guide pin extending the guide pin length; and
the anti-rotation device having a second guide pin passage therethrough,
 the second guide pin passage aligned with the second guide pin,
 the second guide pin sized to pass through the second guide pin passage to permit
 the anti-rotation device to slideably move along the second guide pin.

3. The rod-style actuator of claim 2, wherein the axially-rotatable hollow internally-threaded shaft is provided at one of within the motor, at an end of a solid motor shaft associated with the motor, and at an end of a gear body connected to the motor.

4. The rod-style actuator of claim 3, wherein
the anti-rotation device is attached to the lead screw.

5. The rod-style actuator of claim 3, wherein
the anti-rotation device is formed integral with the lead screw.

6. The rod-style actuator of claim 3, wherein
the anti-rotation device having an anti-rotation device cross-sectional profile,
wherein the first passageway cross-sectional profile is complementary to and larger than the anti-rotation device cross-sectional profile,
the first passageway cross-sectional profile is complementary to the second passageway cross-sectional profile,
the guide pin having a guide pin cross-sectional profile,
the guide pin passage having a guide pin passage cross-sectional profile,
wherein the guide pin passage cross-sectional profile is complementary to and larger than the guide pin cross-sectional profile,
the second guide pin having a second guide pin cross-sectional profile,
the second guide pin passage having a second guide pin passage cross-sectional profile,
wherein the second guide pin passage cross-sectional profile is complementary to and larger than the second guide pin cross-sectional profile,
the piston having a piston cross-sectional profile,
wherein the second passageway cross-sectional profile is complementary to and larger than the piston cross-sectional profile.

7. The rod-style actuator of claim 1, wherein
the anti-rotation device is cylindrical.

8. A rod-style actuator having a displacement for use with a housing and a piston-driven device,
the housing containing a motor,
the motor driving an axially-rotatable hollow internally-threaded shaft, the axially-rotatable hollow internally-threaded shaft positioned within the housing,
comprising,
a body,
the body having a body rear face and a body external front face,
 the body rear face opposite the body external front face,
the body adapted to couple to the housing at the body rear face,
the body adapted to couple to the piston-driven device at the body external front face,
the body having a first passageway from the body rear face toward the body external front face about a body central axis and terminating at a body internal face, the first passageway having a first passageway cross-sectional profile, the first passageway having a first passageway length not less than the sum of the displacement and an anti-rotation device length, and the body having a second passageway from the body external front face to the body internal face along the body central axis, the second passageway having a second passageway length less than the displacement, the second passageway having a second passageway cross-sectional profile, the second passageway cross-sectional profile narrower than the first passageway cross-sectional profile;

a second body, the second body sized to fixedly engage one of the body and the housing, the second body having a guide pin, the guide pin attached to the second body at a second body internal face, the guide pin parallel to the body central axis, the guide pin having a guide pin cross-sectional profile, the guide pin extending a guide pin length toward the body internal face, the guide pin length at least equal to the sum of the displacement and the anti-rotation device length;

a lead screw having a lead screw threaded section terminating at a lead screw rear end and a lead screw main body terminating at a lead screw first end, the lead screw rear end opposite the lead screw first end, the lead screw adapted to engage the axially-rotatable hollow internally-threaded shaft, the lead screw threaded section having a lead screw threaded length greater than the displacement;

an anti-rotation device extending from the lead screw away from the body central axis at the lead screw main body, the anti-rotation device length from an anti-rotation device front to an anti-rotation device rear, the anti-rotation device having a guide pin passage therethrough, the guide pin passage aligned with the guide pin, the guide pin passage sized to a guide pin passage cross-sectional profile to permit the anti-rotation device to slideably move along the guide pin, the anti-rotation device having an anti-rotation device cross-sectional profile, the anti-rotation device sized to fit within the first passageway, the guide pin passage cross-sectional profile larger than the guide pin cross-sectional profile; and a piston, the piston extending from the lead screw at the lead screw first end along the body central axis and sized to slidably reciprocate through the second passageway and configured for attachment to the piston-driven device, the piston having a piston length, the piston having a piston cross-sectional profile, the piston sized to fit within than the second passageway without interference.

9. The rod-style actuator of claim 8, further comprising:

the second body having a second guide pin opposite the body central axis from the guide pin, the second guide pin attached to the second body at the second body internal face, the second guide pin parallel to the body central axis, the second guide pin having the guide pin cross-sectional profile, the second guide pin extending the guide pin length toward the body internal face, the anti-rotation device having a second guide pin passage therethrough, the second guide pin passage aligned with the second guide pin, the second guide pin passage sized to the second guide pin to permit the anti-rotation device to slideably move along the second guide pin.

10. The rod-style actuator of claim 9 further comprising the second body having a second body keyway on a second body exterior face sized to a key, and the body having a body keyway on a first passageway interior face sized to the key; and the key.

11. The rod-style actuator of claim 1 further comprising the anti-rotation device provided with one of a low-friction surface, a coating, and bearings at the guide pin passage.

12. The rod-style actuator of claim 8, wherein the anti-rotation device is cylindrical.

13. The rod-style actuator of claim 1, wherein the second guide pin is positioned opposite the body central axis from the guide pin.

* * * * *